United States Patent Office 2,840,597
Patented June 24, 1958

2,840,597

METHOD FOR PREPARING ESTERS OF α-CHLORO-ISOBUTYRIC ACID

Art C. McKinnis, Long Beach, Calif., assignor, by mesne assignments, to Collier Carbon and Chemical Corporation, a corporation of California No Drawing. Application November 21, 1955
Serial No. 548,260

9 Claims. (Cl. 260—487)

This invention relates to a three-step process for preparing alkyl esters of methacrylic acid, starting with the economical raw materials isobutene and/or tert-butanol, and proceeding via an intermediate α-chloro-isobutyric acid ester. The invention also includes as a novel step in the overall process, the reaction of α-nitro-isobutene and/or nitro-tert-butanol with an excess of hydrogen chloride and a lower alkanol under superatmospheric pressures, to produce the α-chloro-isobutyric acid esters.

The term α-nitro-isobutene is employed herein to designate 1-nitro-2-methyl-propene-1, the term β-nitro-isobutene to designate 1-nitro-2-methyl-propene-3, and the term nitro-isobutene to designate a mixture of the α and β isomers.

In essence the invention embraces the following three steps:

(1) Nitrating isobutene and/or tert-butyl alcohol in liquid phase with nitric acid-water mixtures under certain conditions adapted to produce high yields of two products, viz. nitro-tert.-butanol and α-nitro-isobutene, (2) Reacting either or both of the latter materials with hydrogen chloride and an alkanol under conditions which result in the conversion of those materials to an alkyl ester of α-chloro-isobutyric acid and hydroxylamine hydrochloride, and (3) Subjecting the last named ester to dehydrohalogenation in accordance with known methods to produce the corresponding ester of methacrylic acid.

The particular conditions employed in the nitration step are tailored specifically to produce only products which, in the succeeding hydrochlorination-alcoholysis step, are converted substantially exclusively to the same single product, viz. an alkyl ester of α-chloro-isobutyric acid. Other known nitration steps which have been heretofore applied to isobutene (cf. U. S. Patent Nos. 2,525,-353; 2,402,315; 2,472,552) always result in the production of considerable quantities of undesired materials such as di-chloro, di-nitro, nitro-nitrate, nitro-nitrite, or nitroso derivatives which are not convertble to methacrylate esters via the procedure herein employed. The overall result is that the process herein described provides a much more desirable method, based on economical raw materials, and results in the ultimate conversion of isobutene to methacrylate esters in yields ranging from 50 to 90%. Moreover, the process steps employed are in themselves economical, easily controlled, and require relatively inexpensive reagents.

It is therefore the primary object of this invention to provide new and economical methods for converting isobutene to methacrylate esters in high yields. Another object is to provide a specific nitration step which produces only compounds which may be identically treated so as to result ultimately in methacrylate esters. Conversely, another object is to provide a specific hydrohalogenation-alcoholysis step which is particularly adapted for converting all of the products from the nitration step to a single immediate precursor of methacrylate esters. A specific object is to provide a method for converting α-nitro-isobutene to an ester of α-chloro-isobutyric acid. Another specific object is to provide a method for converting nitro-tert-butanol to an ester of α-chloro-isobutyric acid. Other objects and advantages of the invention will be apparent from the description which follows:

STEP 1.—NITRATION

The initial step employs either isobutene or tert-butanol, or mixtures thereof as the raw material. This raw material is reacted with nitric acid of between about 30% and 85% concentration by weight, at a reaction temperature above about 90° C., under superatmospheric pressure. In order to suppress oxidation and the formation of undesirable by-products, it is preferred to employ a relatively high mole-ratio of $C_4$ reactant to nitric acid, e. g. 2 to 20 moles of tert-butyl alcohol or isobutene should be provided per mole of nitric acid. The overall reactions ensuing are as follows:

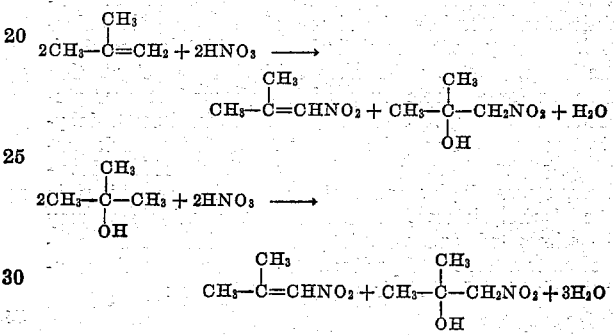

A minor amount of β-nitro-isobutene may also be produced in the above reactions, but its ultimate fate in the process is similar to the α-nitro-isobutene. Separation of the unreacted $C_4$ reactant from the reaction product for re-use is readily accomplished by conventional distillation procedures. The reaction pressure should be sufficient to maintain all of the reactants in the liquid phase at the particular reaction temperature employed, and may advantageously be somewhat higher. Usually, it is preferred to operate at between about 200 and about 2000 p. s. i. g., such pressure being attained either autogenically or by pressuring the reaction vessel with an inert gas.

As stated, the reaction temperature may be as low as about 90° C., in which case the time required to complete the reaction will be of the order of 20–60 minutes. It is preferred, however, to employ somewhat higher temperatures, e. g., 120–200° C., although the reaction temperature should of course not exceed the decomposition temperature of the reactants or the products. The reaction time varies inversely with the reaction temperature; when operating at about 150°–220° C., the reaction time is about 1–10 minutes, and will be correspondingly shorter at higher reaction temperatures.

The reaction may be conducted batch-wise simply by charging the desired quantities of reactants into a suitable pressure vessel, and heating the vessel and contents at the desired reaction temperature until reaction is essentially complete. The elevated pressure may be attained autogenically or it may be applied from an exterior source. The vessel and contents are then quickly cooled, excess pressure is released, and the liquid reaction product is distilled or otherwise treated to separate the nitro-alcohol and nitro-olefin products separately or in admixture.

When operating on a commercial scale it is usually more convenient and economical to operate on a continuous basis. The continuous reactor may suitably comprise a coil capable of withstanding the pressures involved, and mounted in a furnace or salt bath heater. The $C_4$ and nitric acid reactants are passed through such coil under pressure at such a rate that the transit time through the coil corresponds to the reaction time at the reaction temperature employed. The effluent from the heated coil is cooled (if desired by indirect heat exchange against either or both of the reactants) and is then passed through a pressure relief valve into a continuous fractional distillation column. The latter is operated to produce an overhead fraction comprising unreacted $C_4$ reactant, water, and possibly a small quantity of nitric acid and/or nitrogen oxides, one or more middle fractions comprising the nitro-alcohol and nitro-olefin, and a small bottoms fraction consisting of by-products. The overhead fraction is sent to a settling drum, and the organic layer is separated from the water and recycled back to the reactor.

STEP 2.—HYDROHALOGENATION-ALCOHOLYSIS

In this step, either or both of the products from the nitration step is treated under anhydrous conditions with an alkanol and hydrogen chloride. However, the conversion to α-chloro-isobutyric ester under equivalent conditions is better from the nitro-olefin than the nitro-alcohol. It may hence be desirable to subject the total nitration product, or the nitro-alcohol, to a dehydration step, as for example by passing such product over alumina or silica gel at 130–200° C. Other known dehydration methods may be employed, as for example employing phosphorus pentoxide or zinc chloride. However, by employing more severe reaction conditions in the alcoholysis step, the separate dehydration step may be eliminated, and essentially all the nitro alcohol converted to the desired product. The overall reactions ensuing in the alcoholysis step are as follows:

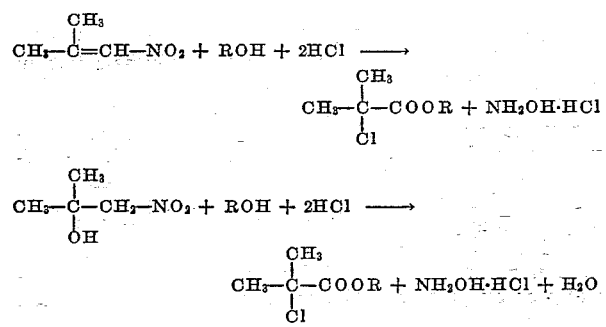

It is known that nitro-tert-butyl chloride will react with alkanols in the presence of hydrogen chloride to form esters of α-chloro-isobutyric acid (U. S. Patent No. 2,525,353). It has been found however that when the more economical raw materials, α-nitro-isobutene, or nitro-tert-butanol are employed, under high pressures of excess HCl, better yields are obtained, and the reaction time is shortened. This is apparently because the reaction starting with nitro-tert-butyl chloride proceeds through a different mechanism than does the reaction starting with α-nitro-isobutene or nitro-tert-butanol; the former is apparently not an intermediate produced in the treatment of the latter two materials.

Any primary alkanol may be employed including methanol, ethanol, propanol, butanol, isobutanol, the various pentanols and hexanols. These constitute the preferred alcohols, and the selection depends upon the particular methacrylate ester which is desired. However, the higher alkanols may also be employed, including lauryl alcohol, octadecyl alcohol and the like. Mixtures of such alcohols may also be employed if mixed esters are desired. The alcohol is employed in ratios ranging between about 1 and 6 mols thereof per mole of nitro compound, and preferably between about 1 and 4 moles.

Hydrogen chloride is employed in ratios ranging between about 2 and 15 moles thereof per mole of nitro compound, and preferably between about 2 and 10 moles thereof. Substantially dry hydrogen chloride is used, either dissolved in the alcohol, or continuously added during the reaction.

The alcoholysis is conducted at temperatures ranging between about 40° and 160° C., preferably between about 60° and 120° C. At lower temperatures the reaction rate is undesirably slow, while at higher temperatures undesired oxidation reactions are favored resulting in a reduction in yield of the desired products. A critical feature in the alcoholysis step resides in adjusting the temperature, pressure and reaction time so that the desired reactions are completed before any substantial oxidation occurs. It is preferred to adjust the temperature and pressure so that the reaction may be completed in from about one minute to one hour. At high temperatures, the reaction time will be in the minimum range, while at lower temperatures reaction times as long as six to twelve hours may sometimes be feasible. The pressure during the reaction is preferably the autogenous pressure of the system, and this depends upon the proportion of hydrogen chloride employed and the temperature. At 90° C. for example, the pressure under the preferred conditions usually ranges between about 200 and 600 p. s. i. g. In order to minimize corrosion of equipment, it may be desirable to pressure the apparatus with an inert gas such as nitrogen so as to maintain most of the hydrogen chloride dissolved in the liquid phase.

The alcoholysis step may be carried out either batchwise or continuously as described in connection with the nitration step. In a continuous process, the nitro compound or compounds may be heated to the desired reaction temperature, rapidly mixed with the alcoholic hydrogen chloride, and passed under pressure through a tubular reactor immersed in a suitable heater, and the residence time adjusted by varying the liquid flow rate. The effluent from the reactor is then cooled and subjected to filtration or settling to remove solid hydroxylamine hydrochloride. The liquid product may then be distilled to recover unreacted alkanol and hydrogen chloride for recycle. The remaining product may then be water-washed to remove remaining traces of hydroxylamine hydrochloride, and the washed product may then be distilled to recover the pure ester of α-chloro-isobutyric acid.

If the reaction system is sufficiently anhydrous, some methyl hydroxylamine hydrochloride may be recovered along with the hydroxylamine hydrochloride. Any unreacted nitro compound is recovered during the fractionation of the esters and is recycled along with the unreacted alkanol and hydrogen chloride.

STEP 3.—DEHYDROHALOGENATION

This familiar step is conventional in the art and hence need not be described in detail. For example, the α-chloro-isobutyric acid ester may be passed in vapor phase at 200–300° C. over silica gel or alumina gel to effect the dehydrohalogenation. Such a process is described for example in U. S. Patent No. 2,111,509. Other suitable processes are described in U. S. Patent No. 2,028,012.

The following examples will illustrate several ways in which the principles of the invention have been applied, but are not to be construed as limiting the invention.

*Example I*

Twelve parts by volume of 70% aqueous nitric acid and 120 parts by volume of tert-butyl alcohol were charged to a glass-lined pressure vessel, and the latter was then pressured up to about 600 p. s. i. g. with nitrogen. The vessel and contents were then heated to 130° C. over a period of 15 minutes, held at this temperature for about 10 minutes, and then allowed to cool. The vessel was vented and the contents were steam distilled to obtain α-nitro-isobutene in about 38% yield, based on nitric acid consumed. The bottoms fraction was then distilled under vacuum, whereby there was obtained an aqueous forerun, nitro-tert-butyl alcohol in an amount corresponding to a yield of 32% based on nitric acid, and a small bottoms fraction. The over-all yield of the two desired products was thus about 70%, and the two products were formed in substantially equimolecular proportions.

*Example II*

Two hundred parts by volume of isobutene and 22 parts by volume of 70% nitric acid were charged to a glass-lined pressure vessel and heated under autogenic pressure at about 55° C. for 1 hour. The temperature was then increased to about 110° C. and held at this value for 1 hour. The vessel was vented and the contents removed and steam-distilled at about 130 mm. pressure to obtain good yields of α-nitro-isobutene and nitro-tert-butyl alcohol.

*Example III*

Ten volumetric parts of liquid nitro-isobutene (about 80% α-nitro-isobutene) was mixed with 12 volumetric parts of dry methanol, and the solution was saturated with dry hydrogen chloride at 0° C. About 12 gravimetric parts of HCl was absorbed. The resulting mixture was then placed in a glass-lined pressure vessel and heated for 30 minutes at 80° C. under 600 p. s. i. g. of nitrogen. The vessel was then cooled and vented. About 2.7 gravimetric parts of solid hydroxylamine hydrochloride (40% yield) was recovered from the liquid product. The remaining liquid was then washed with saturated aqueous sodium sulfate, dried and distilled under reduced pressure. The products recovered included 2.5 gravimetric parts of methyl chloride and 12.5 volumetric parts of crude methyl α-chloro-isobutyrate. This represents a yield of 90%, based on the original nitro-isobutene.

*Example IV*

Ten volumetric parts of liquid nitro-tert-butanol was mixed with 12 volumetric parts of dry methanol, and the solution was saturated with dry hydrogen chloride at 0° C. About 12 gravimetric parts of HCl was absorbed. The resulting mixture was then placed in a glass-lined pressure vessel and heated for 55 minutes at 75° C. under 500 p. s. i. g. of nitrogen. The product was worked up as described in Example III to recover 5.0 gravimetric parts of methyl chloride and 8.8 gravimetric parts of methyl α-chloro-isobutyrate. This represents a yield of 68%, based on the original nitro-tert-butanol.

*Example V*

The combined products from Example I, comprising about 7.3 gravimetric parts of nitro-isobutene (about 80% α-nitro-isobutene) and 7.2 parts of nitro-tert-butanol are mixed with 20 volumetric parts of methanol, and the mixture is saturated at 0° C. with dry hydrogen chloride. The resulting mixture is then heated in a glass-lined pressure vessel for 20 minutes at 85° C. under 500 p. s. i. g. of nitrogen. The resulting hydroxylamine hydrochloride and methyl α-chloro-isobutyrate are recovered as described in Example III. The α-chloro-isobutyrate is then subjected to dehydrohalogenation by dissolving the same in diethyl phthalate containing about 1% of zinc chloride, and boiling the solution. About 8.7 parts by weight of colorless methyl methacrylate is recovered overhead. This amount of product recovered corresponds to about 0.46 mole per mole of nitric acid consumed, and about 40–50% of the nitric acid consumed is recoverable as hydroxylamine hydrochloride. Of the original tert-butanol, about 11% is converted to isobutene in the nitration step, about 78% is recovered unchanged, and of the remaining 11% consumed, about 64% is converted to methyl methacrylate.

By substituting other primary alkanols in Examples III, IV and V, substantially similar product yields of the corresponding esters are obtained. Those skilled in the art will appreciate that the details described in all the examples, and elsewhere in the description, may be varied considerably to obtain the same ends. The description should therefore not be construed as limiting in scope in the absence of explicit statements to that effect. Neither should the disclosure of alternatives be construed as determinative of the fact of equivalence. The true scope of the invention is intended to be embraced by the following claims:

I claim:

1. A process for preparing a primary alkyl ester of α-chloro-isobutyric acid from a raw material selected from the class consisting of tert-butanol, isobutene and mixtures thereof, which comprises subjecting said raw material to nitration with aqueous nitric acid of 30–85% concentration at a temperature between about 90° and 220° C. and a pressure sufficient to maintain the reactants in the liquid phase, the initial mole-ratio of total raw material to nitric acid being within the range of about 2/1 to 20/1, whereby a nitration product is obtained which is predominantly α-nitro-isobutene and nitro-tert-butanol, removing excess unreacted raw material, and reacting said nitration product with a primary alkanol and hydrogen chloride at a temperature between about 40° and 160° C. under pressure sufficient to maintain the reactants in the liquid phase, thereby converting each of said nitration products to an alkyl ester of α-chloro-isobutyric acid, and recovering said ester from the reaction mixture.

2. A process as defined in claim 1 wherein said primary alkanol is methanol.

3. A process as defined in claim 1 wherein said raw material is tert-butanol.

4. A process for preparing an alkyl ester of α-chloro-isobutyric acid which comprises reacting α-nitro-isobutene with a primary alkanol and hydrogen chloride under substantially anhydrous conditions at a temperature between about 40° and 160° C. and a pressure sufficient to maintain the reactants in the liquid phase, and recovering the resulting alkyl ester of α-chloro-isobutyric acid.

5. A process as defined in claim 4 wherein said primary alkanol is methanol.

6. A process as defined in claim 4 wherein said temperature is between about 60° and 120° C.

7. A process for preparing an alkyl ester of α-chloro-isobutyric acid which comprises reacting nitro-tert-butanol with a primary alkanol and hydrogen chloride under initially substantially anhydrous conditions at a temperature between about 40° and 160° C. and a pressure sufficient to maintain the reactants in the liquid phase, and recovering the resulting alkyl ester of α-chloro-isobutyric acid.

8. A process as defined in claim 7 wherein said primary alkanol is methanol.

9. A process as defined in claim 7 wherein said temperature is between about 60° and 120° C.

References Cited in the file of this patent

UNITED STATES PATENTS

| | | |
|---|---|---|
| 2,111,509 | Loder | Mar. 15, 1938 |
| 2,511,915 | Himel | June 20, 1950 |
| 2,525,353 | Himel | Oct. 10, 1950 |

OTHER REFERENCES

Haitinger: Ann. Chim. (Liebig) vs. 193 (1878), pp. 376 to 383.